United States Patent
Hu

[19]

[11] Patent Number: 5,822,595
[45] Date of Patent: Oct. 13, 1998

[54] METHOD AND APPARATUS FOR PROVIDING AN INTERRUPT HANDLER EMPLOYING A TOKEN WINDOW SCHEME

[75] Inventor: King Seng Hu, Penang, Malaysia

[73] Assignee: Intel Corporation, Santa Clara, Calif.

[21] Appl. No.: 581,463

[22] Filed: Dec. 29, 1995

[51] Int. Cl.$^6$ ............................. G06F 13/24; G06F 13/32
[52] U.S. Cl. ....................... 395/737; 395/735; 395/736; 395/742; 395/868
[58] Field of Search ................................. 395/737, 742, 395/734, 735, 736, 739, 727, 728, 459, 868, 869; 711/132

[56] References Cited

U.S. PATENT DOCUMENTS

| | | | |
|---|---|---|---|
| 4,636,944 | 1/1987 | Hodge | 395/737 |
| 5,060,139 | 10/1991 | Theus | 395/303 |
| 5,287,523 | 2/1994 | Allison et al. | 395/870 |
| 5,469,571 | 11/1995 | Bunnell | 395/673 |
| 5,530,875 | 6/1996 | Wach | 395/737 |

*Primary Examiner*—Ayaz R. Sheikh
*Assistant Examiner*—Ario Etienne
*Attorney, Agent, or Firm*—Blakely, Sokoloff, Taylor & Zafman

[57] ABSTRACT

An interrupt handler unit (IHU) for polling and arbitrating among interrupt sources and for generating a request for interrupt to a processor if winning priority is higher than an in-progress priority. The interrupt handler unit, upon acknowledgment by the processor, generates a vector address on an interface bus and at the same time pushes an acknowledged priority onto an in-progress priority (IPP) stack. The interrupt acknowledge is then provided to the appropriate interrupt source for the source to clear a pending flag. Upon a return from interrupt (RETI) instruction, the in-progress priority (IPP) stack is popped by the interrupt handler unit. The interrupt channels are time multiplexed based on interrupt state signals, and the individual interrupt sources can be masked. Interrupt related registers, (such as enable, priority, and flag) reside in the interrupt handler unit. The priority of an individual interrupt source is programmable using an interrupt priority registers, which are also provided in the IHU.

11 Claims, 18 Drawing Sheets

| NAME | I/O | DESCRIPTION |
|---|---|---|
| PH1S | I | PHASE 1 SLEEP CLOCK. |
| PH2S | I | PHASE 2 SLEEP CLOCK. |
| POCq2 | I | SYNCHRONIZED RESET. |
| IB2ARSq1_n | I | SFR ADDRESS CYCLE. |
| IB2ARq1_n | I | WRITE IBu1x DATA TO ADDRESSED SFR. |
| AR2IBq1_n | I | READ ADDRESSED SFR TO IBu1x. |
| RTIq1 | I | RETURN FROM INTERRUPT, INDICATES EXECUTION OF RETI INSTRUCTION. |
| INTAq1 | I | INTERRUPT ACKNOWLEDGE CYCLE. |
| TRPAq1 | I | TRAP INTERRUPT ACKNOWLEDGE. |
| IREQq1_n[2:0] | IO | INTERRUPT REQUEST AND ACKNOWLEDGE CHANNEL FOR INTERRUPT SOURCES. PHASE 1 ACKNOWLEDGE, PHASE 2 POLLING. |
| IBu1x[7:0] | IO | PERIPHERAL BUS. PRECHARGED ON PH1S. TRANSFER BOTH ADDRESS AND DATA. |
| ISTATEq1x[1:0] | O | ENCODED INTERRUPT HANDLER STATE 0 TO 3. |
| INTRq2 | O | INTERRUPT REQUEST TO CPU FOR VALID INTERRUPT. |
| INT0Eq1_n | O | EXTERNAL INTERRUPT 0 ENABLE BIT (INVERTED). |
| INT1Eq1_n | O | EXTERNAL INTERRUPT 1 ENABLE BIT (INVERTED). |
| EAq2 | O | ENABLE ALL BIT. |

FIG. 3B

C0=ICH0 & ICH0_PR10
C1=ICH1 & ICH1_PR10
C2=ICH2 & ICH2_PR10

| NAME | I/O | DESCRIPTION |
|---|---|---|
| PH1S | I | PHASE 1 SLEEP CLOCK. |
| PH2S | I | PHASE 2 SLEEP CLOCK. |
| POCq2 | I | SYNCHRONIZED RESET. |
| ISTATEq1[1:0] | I | POLLING SEQUENCE STATE COUNTER. |
| ISTATEq2[1:0] | I | PHASE 2 VERSION OF ISTATEq1[1:0]. |
| INTAq1 | I | INTERRUPT ACKNOWLEDGE CYCLE. |
| TRPAq1 | I | TRAP INTERRUPT ACKNOWLEDGE. |
| RTIq1 | I | RETURN FROM INTERRUPT, INDICATES EXECUTION OF RETI INSTRUCTION. |
| ICH0 | I | CHANNEL 0 INTERRUPT. MASKED VERSION OF IREQq1_n[0] OUTPUT FROM Z1IHORWP MODULE. |
| ICH1 | I | CHANNEL 1 INTERRUPT. MASKED VERSION OF IREQq1_n[1] OUTPUT FROM Z1IHORWP MODULE. |
| ICH2 | I | CHANNEL 2 INTERRUPT. MASKED VERSION OF IREQq1_n[2] OUTPUT FROM Z1IHORWP MODULE. |
| ICH0_PRIO[1:0] | I | CHANNEL 0 PRIORITY VALUE OUTPUT FROM Z1IHORWP MODULE. CONCATENATION OF HPRIOq2[0] & LPRIOq2[0]. |
| ICH1_PRIO[1:0] | I | CHANNEL 1 PRIORITY VALUE OUTPUT FROM Z1IHORWP MODULE. CONCATENATION OF HPRIOq2[1] & LPRIOq2[1]. |
| ICH2_PRIO[1:0] | I | CHANNEL 2 PRIORITY VALUE OUTPUT FROM Z1IHORWP MODULE. CONCATENATION OF HPRIOq2[2] & LPRIOq2[2]. |
| WRREGq1 | I | ACTIVE HIGH SIGNAL WHICH INDICATES A WRITE HAS OCCURRED TO IEx, IPLx OR IPHx REGISTERS. |
| IB_VECq1[7:0] | O | INTERRUPT SERVICE ROUTINE (ISR) VECTOR OUTPUT TO Z1IHORWP MODULE. |
| IREQq1_n[2:0] | O | INTERRUPT REQUEST AND ACKNOWLEDGE CHANNEL FOR INTERRUPT SOURCES. PHASE 1 ACKNOWLEDGE, PHASE 2 POLLING. |
| ACK_ICHq2[2:0] | O | CHANNEL ACKNOWLEDGE BUS. CONTAINS THE ACKNOWLEDGE BITS TO BE OUTPUT ONTO IREQq1_n[2:0]. |
| INTRq2 | O | INTERRUPT REQUEST TO CPU FOR VALID INTERRUPT. |

FIG. 4B

METHOD AND APPARATUS FOR PROVIDING AN INTERRUPT HANDLER EMPLOYING A TOKEN WINDOW SCHEME

BACKGROUND OF THE INVENTION

The present invention relates generally to computer systems and particularly to interrupt handlers for a processor.

Description of Related Art

FIG. 1 illustrates one prior art approach of handling interrupts in a computer system. In a computer system with a processor (CPU) having a machine cycle that includes six states with each state occupying two phases of the system clock, the steps for handling an interrupt are as follows. In cycle one (C1), the interrupts are latched. In cycle two (C2), arbitration is performed that resolves the priority between the interrupts. In cycles three and four (C3 and C4), the program counter is stored into a register, a branch vector address of an interrupt service routine (ISR). In cycle five (C5) the interrupt service routine begins execution.

Consequently, the prior art requires at a minimum, six states to latch the interrupt sources and six states to arbitrate and determine the priority between these interrupts. Thus, a total of twelve states are needed before branching to the interrupt service routine.

One of the disadvantages of this prior art approach is that six states are required to latch the interrupt sources. Moreover, an interrupt is no longer treated as an asynchronous event. In other words, lower priority interrupts may never get serviced if higher priority interrupts exist within the interrupt processing period which takes five cycles or more. In the preceding example, the nesting of interrupts is possible only at the six state boundaries. Consequently, this prior art method cannot capture the asynchronous nature of the interrupts very precisely.

Accordingly, a method and apparatus for providing greater granularity than that provided in the prior art and also for reducing the latency involved in latching the interrupt sources from twelve states to a single state is desirable.

BRIEF SUMMARY OF THE INVENTION

The present invention provides an interrupt handler for a processor that implements a polling and arbitration method based on a time window scheme. The present invention overcomes the shortcomings of the prior art, as outlined in the Background, and may be implemented with minimal hardware. Furthermore, the present invention is flexible, easily expandable, and greatly reduces the latency involved in processing the interrupts.

The present invention divides the interrupt sources into sub-groups. Each of these sub-groups are polled and arbitrated on a rotating time window. The operation for each window is identical and is completed in a single state. This allows a faster response to an interrupt request. The present interrupt handler does not require that all interrupt sources be polled before arbitration, as the conventional, prior art interrupt schemes required.

The present invention implements a time window scheme. In this scheme, interrupt sources are broken into sub-groups called windows and the interrupt sources within a window are polled in a fashion similar to conventional polling of interrupt sources. However, the present invention performs arbitration for the polled sources of that window and also the winning interrupt from the previous window. From these interrupt sources, a winning interrupt is determined and registered for that window. A request is also immediately posted to the processor within one state of a machine cycle.

This process of polling the interrupt sources and the winning interrupt from a previous window is repeated in a rotating time window to ensure the continuous polling and arbitration for all interrupt sources. The highest priority interrupt is always awarded processor access.

The present invention includes the following advantages. The present invention reduces the latency in polling the sources because less interrupt sources need to be polled within a time window. Additionally, the present invention may be implemented with lower cost because the hardware for polling and arbitrating, based on a time window scheme of the present invention, is simpler than the prior art hardware. Also, a shared hardware for each window allows for easy expansion of interrupt sources by adding a satellite station.

BRIEF DESCRIPTION OF THE DRAWINGS

The present invention is illustrated by way of example and not limitation in the figures of the accompanying drawings in which like references indicate similar elements.

FIG. 3B describes the functional signals associated with the block diagram of FIG. 3A.

FIG. 4B describes the functional signals associated with the block diagram of FIG. 4A.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances, well known electrical structures and circuits are shown in block diagram form in order not to unnecessarily obscure aspects of the present invention.

The present invention is an Interrupt Handler Unit (IHU) that is responsible for the following:

- reading and writing the IHU special function registers (SFR) via an IB bus interface;
- polling and arbitrating interrupts via a peripheral interface;
- acknowledging peripheral devices via the peripheral interface;
- generating interrupt requests to the CPU; and
- supplying the ISR vector to the CPU via the IB bus interface.

The IHU contains three major functional blocks: the IB bus interface, the peripheral interface, and the global priority resolver. The IB bus interface contains the data and control signals necessary to read and write the IHU SFR registers, and to output the ISR vector for interrupts that have been acknowledged by the CPU. The peripheral interface includes three bi-directional interrupt request lines that couple the peripheral devices to the IHU. Each of these signals accepts interrupt requests from the peripheral devices during phase two, and provides an acknowledge signal to the peripherals during phase one (see FIG. 3). The global priority resolver uses the interrupt request lines, together with the enable, priority, and flag registers to resolve the interrupt priority and issue interrupt requests to the CPU.

The IHU is configured with three interrupt channels that are polled in a four-state circular sequence to provide a total of twelve interrupt sources. During each of the four interrupt states, three channels are polled. Therefore, each channel can be coupled to a maximum of four interrupt sources. If the highest priority of all currently polled, enabled interrupts is higher than the interrupt in service, an interrupt is requested. Each interrupt source can be masked by its corresponding enable bit in the interrupt enable registers (IE0 and IE1). Each interrupt source can be programmed to one of four priority levels (i.e., 0 being lowest to 3 being highest), via the interrupt priority registers (IPH0, IPL0, IPH1, and IPL1). In a preferred embodiment, two interrupt flag registers are provided for debug purposes. These flag registers generate an interrupt when set to 1.

Figure 1:
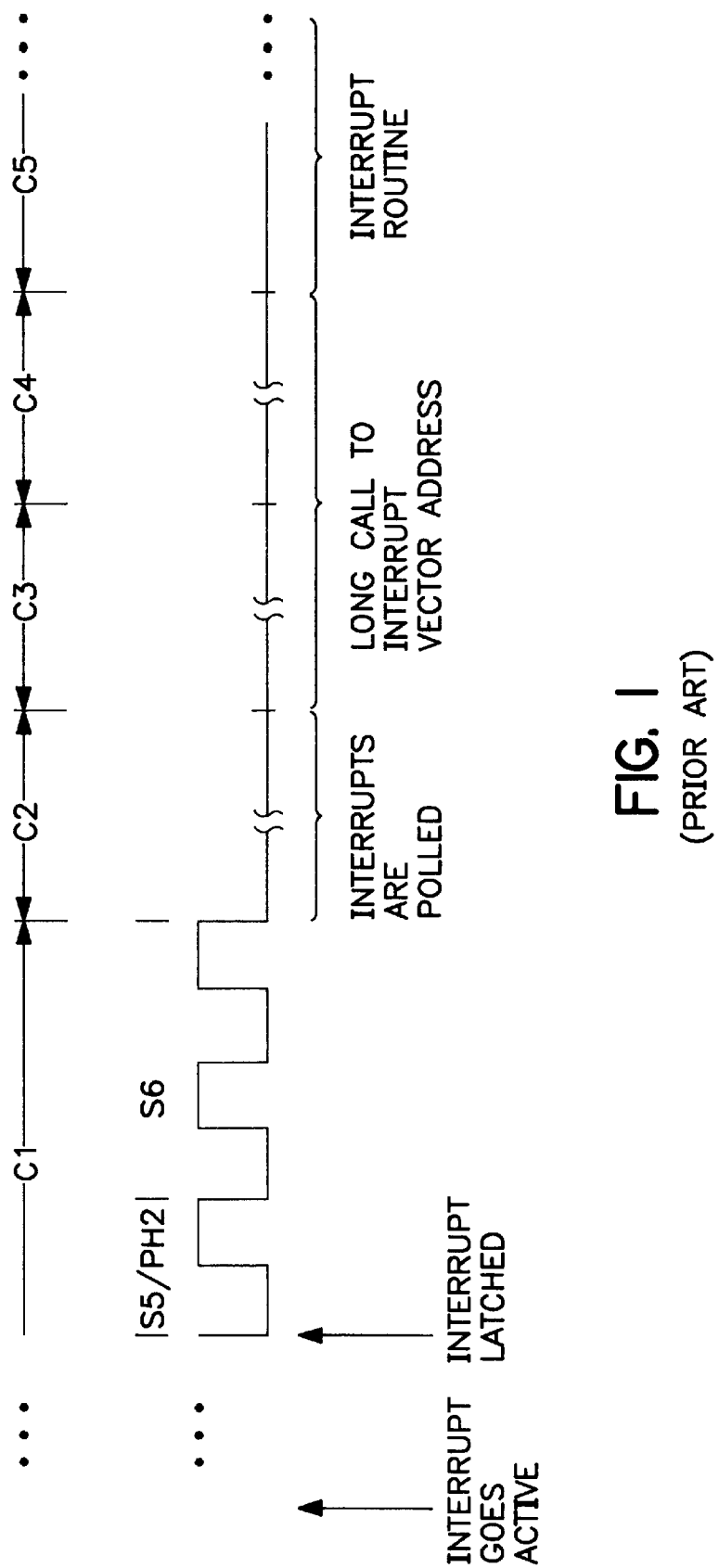
FIG. 1 illustrates a prior art approach to handling interrupts.
Figure 2:
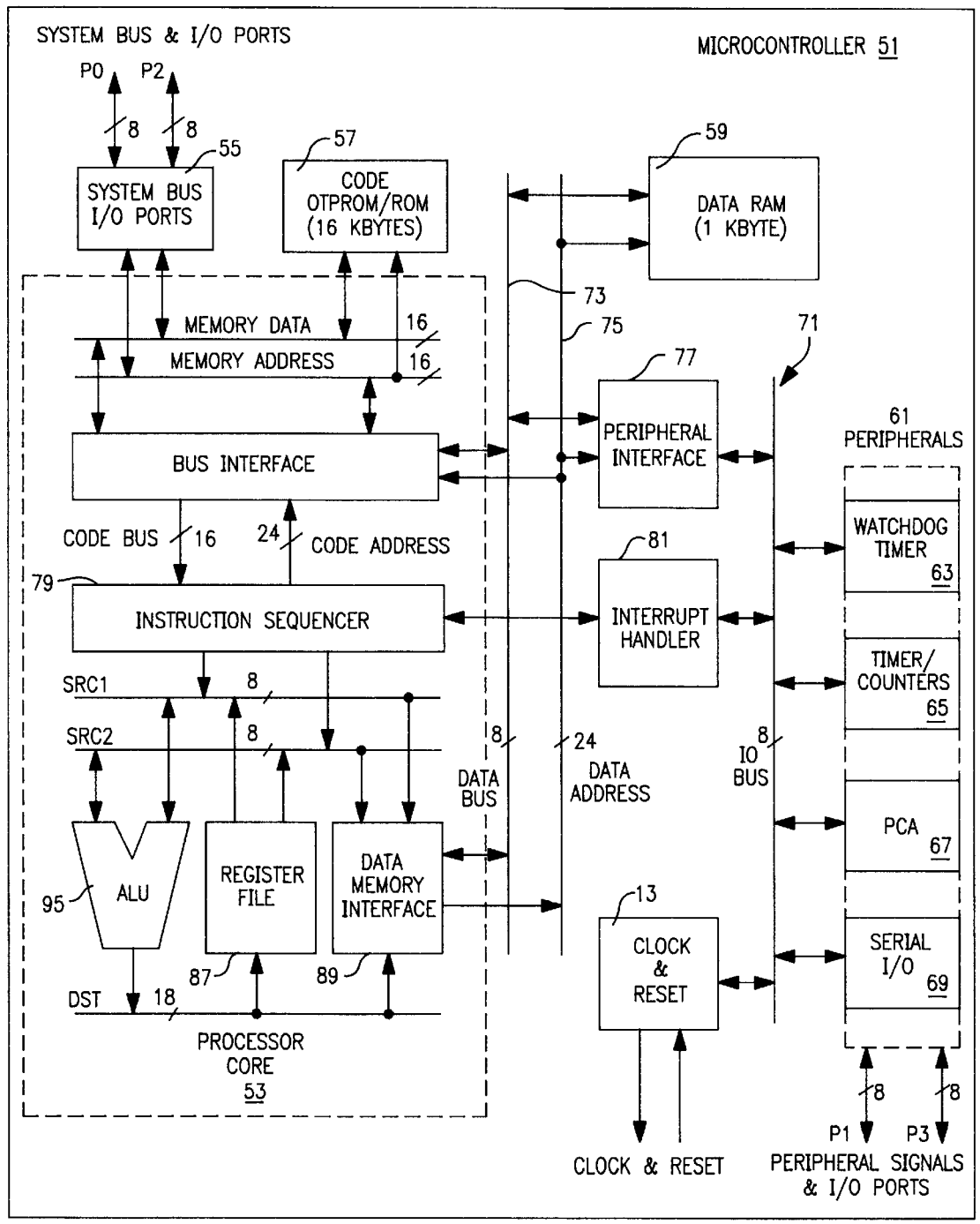
FIG. 2 illustrates a computer system in which the present invention may be implemented.

FIG. 2 illustrates a block diagram of a microcontroller in which the present invention may be implemented. A microcontroller 51 includes a Processor Core 53 that is coupled to a System Bus and I/O Ports Interface 55 and Read Only Memory (ROM) 57 for storing program instruction via a memory data bus and a memory address bus. The Processor Core 53 is also coupled to Random Access Memory (RAM) 59 for storing data through data bus 73 and a data address bus 75. Microcontroller 51 also includes a plurality of peripherals 61 (e.g., a Watchdog Timer/63, timer and counters 65, a programmable counter array 67 (PCA), and a serial I/O port 65. These peripherals 61 are coupled to the Processor Core 53 via a Peripheral Interface Unit (PIU) 77 and an Interrupt Handler Unit (IHU) 81. The peripherals 61 are coupled to the Peripheral Interface Unit 77 and the Interrupt Handler Unit 81 through an internal bus (IB) 71 and an Interrupt Request (IREQ) bus, respectively.

The PIU 77 acts as a bridge between the IB 71 and a data bus 73 and a data address bus 75. The IHU 81 receives interrupts from the peripherals and other devices on the IB 71 and communicates with an Instruction Sequencer 79 that is part of the Processor Core 53. The present invention may be implemented in the IHU 81. Table I describes the IHU signals.

TABLE I

Interrupt Handler Signal Description

| Name | I/O | Description |
| --- | --- | --- |
| PH1S | I | Phase 1 sleep clock. |
| PH2S | I | Phase 2 sleep clock. |
| POCq2 | I | Synchronized RESET. |
| IB2ARSq1_n | I | SFR address cycle. |
| IB2ARq1_n | I | Write IBu1x data to addressed SFR. |
| AR2IBq1_n | I | Read addressed SFR to IBu1x. |
| RTIq1 | I | Return from interrupt, indicates execution of RETI instruction. |
| INTAq1 | I | Interrupt acknowledge cycle. |
| TRPAq1 | I | TRAP interrupt acknowledge. |
| IREQq1_n[2:0] | IO | Interrupt request and acknowledge channel for interrupt sources. Phase1 acknowledge, Phase 2 polling. |
| IBu1x[7:0] | IO | Peripheral bus. Precharged on PH1S. Transfer both address and data. |
| ISTATEq1[1:0] | O | Polling sequence state counter. |
| INTRq2 | O | Interrupt request to CPU for valid interrupt. |
| INT0Eq2_n | O | External Interrupt 0 Enable bit. (Not(IE0[0]). |
| INT1Eq2_n | O | External Interrupt 1 Enable bit. (Not(IE0[2]). |
| EAq2 | O | Enable All bit. (IE0[7]). |

The Processor Core 53 also includes an Arithmetic Logic Unit (ALU) 85, a Register File 87 and Data Memory Interface 89. These blocks, as well as the other blocks shown in the Processor Core 53, are known in the art and will not be described further.

A Clock and Reset Unit (CRU) 83 is coupled to the IB 71. The CRU 83 provides a synchronized hardware reset and also clock signals to the whole computer system.

As mentioned previously, the IHU polls and arbitrates among the interrupt sources and requests an interrupt to the CPU if the winning priority is higher than the in-progress priority (i.e., higher in priority than the priority of the in-progress Interrupt Services Routine (ISR)). Upon acknowledgment by the CPU, the IHU places a vector address of the interrupt on the IBu1x bus and at the same time pushes the acknowledged priority onto an in-progress priority stack, which will be described in greater detail hereinafter. An interrupt acknowledge is then sent out to the appropriate interrupt source for it to clear a pending flag, if applicable. Upon execution of a return from interrupt (RETI) instruction, the in-progress priority stack is popped. As discussed previously, the interrupt channels are time-multiplexed based on interrupt state signal (ISTATEq1[1:0]). The individual interrupt sources can be masked using methods that are known in the art. The IHU includes enable, priority, and flag registers, which will be described in greater detail hereinafter. The priority of the individual interrupt source is programmable by using the Interrupt Priority Registers. The TRAP request has the highest priority and is always enabled.

Figure 3A:
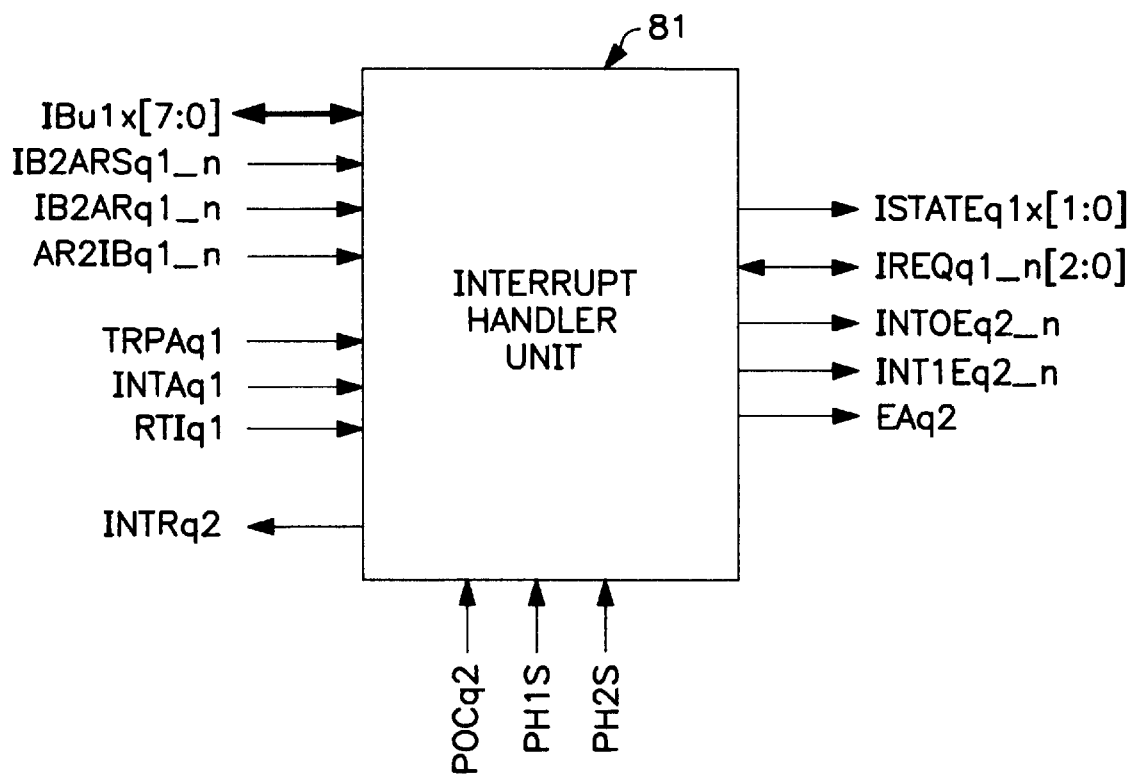
FIG. 3A illustrates a simplified block diagram of the present invention.

FIG. 3A illustrates a symbolic diagram of the IHU of the present invention. FIG. 3B describes the various signals associated with the IHU.

A BRIEF FUNCTIONAL DESCRIPTION OF THE IHU

In one embodiment of the present invention, the IHU is configured with four state windows with each window having three channels. The number of channels is scalable depending on configuration requirements. Accordingly, the IHU provides a total of twelve interrupt sources. During each of the four interrupt states (i.e., windows), three separate channels are polled. If the highest priority of all currently polled enabled interrupts is higher than the interrupt in service, an interrupt is requested to the CPU through the INTRq2 signal. In this embodiment, the TRAP interrupt is the only exception to the above-noted polling.

Table VIII illustrates the sequence of interrupt polling and interrupt request. In Phase 1 (PHS1) of a state, the priorities of the three currently polled channels and the winner of the previously polled window are resolved. In Phase 2 (PHS2), the interrupt channels are polled. If the interrupt source requests an interrupt and is enabled (i.e., not masked), an interrupt request is sent to a global interrupt controller, which will be described in greater detail hereinafter. An interrupt is requested (i.e., the INTRq2 signal is asserted and sent to the CPU) if the highest priority of previously (n−1) polled interrupts is greater than the interrupt in-progress.

TABLE VIII

| | |
|---|---|
| state n, phase 1 | Priorities of the 3 currently polled channels & previously polled priority are resolved. |
| state n, phase 2 | Interrupt channels polled. If interrupt source requests interrupt and is enabled, an interrupt request is sent to the global interrupt controller.<br>An interrupt will be requested (active INTRq2) to the CPU if the highest priority of previously (n−1) polled Interrupts > Interrupt in-wait |

Figure 3C:
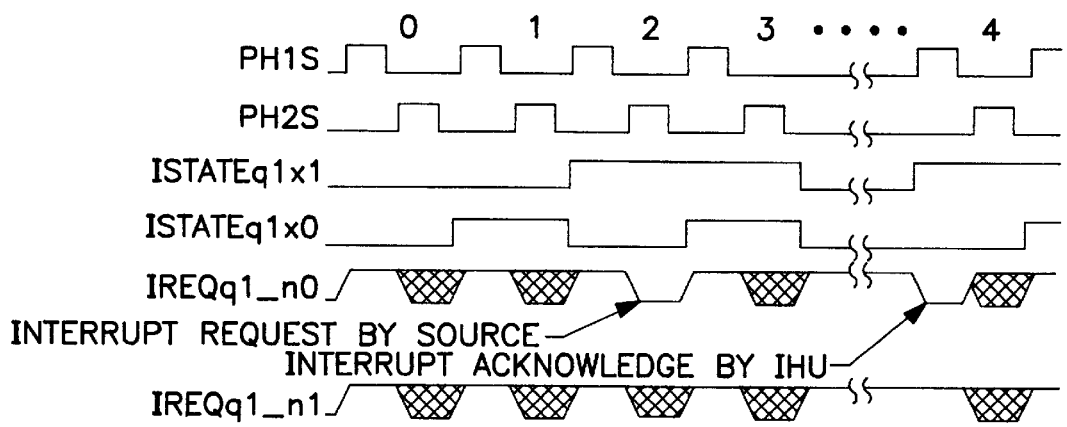
FIG. 3C illustrates the timing diagram for the interrupt polling and source acknowledge sequence employed by the present invention.

FIG. 3C illustrates the timing diagram for the interrupt polling and source acknowledge sequence. As is evident from FIG. 3C, an interrupt by an interrupt source (e.g., device) is acknowledged by the IHU in the same window (i.e., either window0, window1, window2, window3) as the window in which the interrupt request is initiated. FIG. 3C illustrates an example in which the interrupt request by interrupt source occurs in window2 and the interrupt acknowledged by the IHU correspondingly occurs in window2.

Figure 3D:
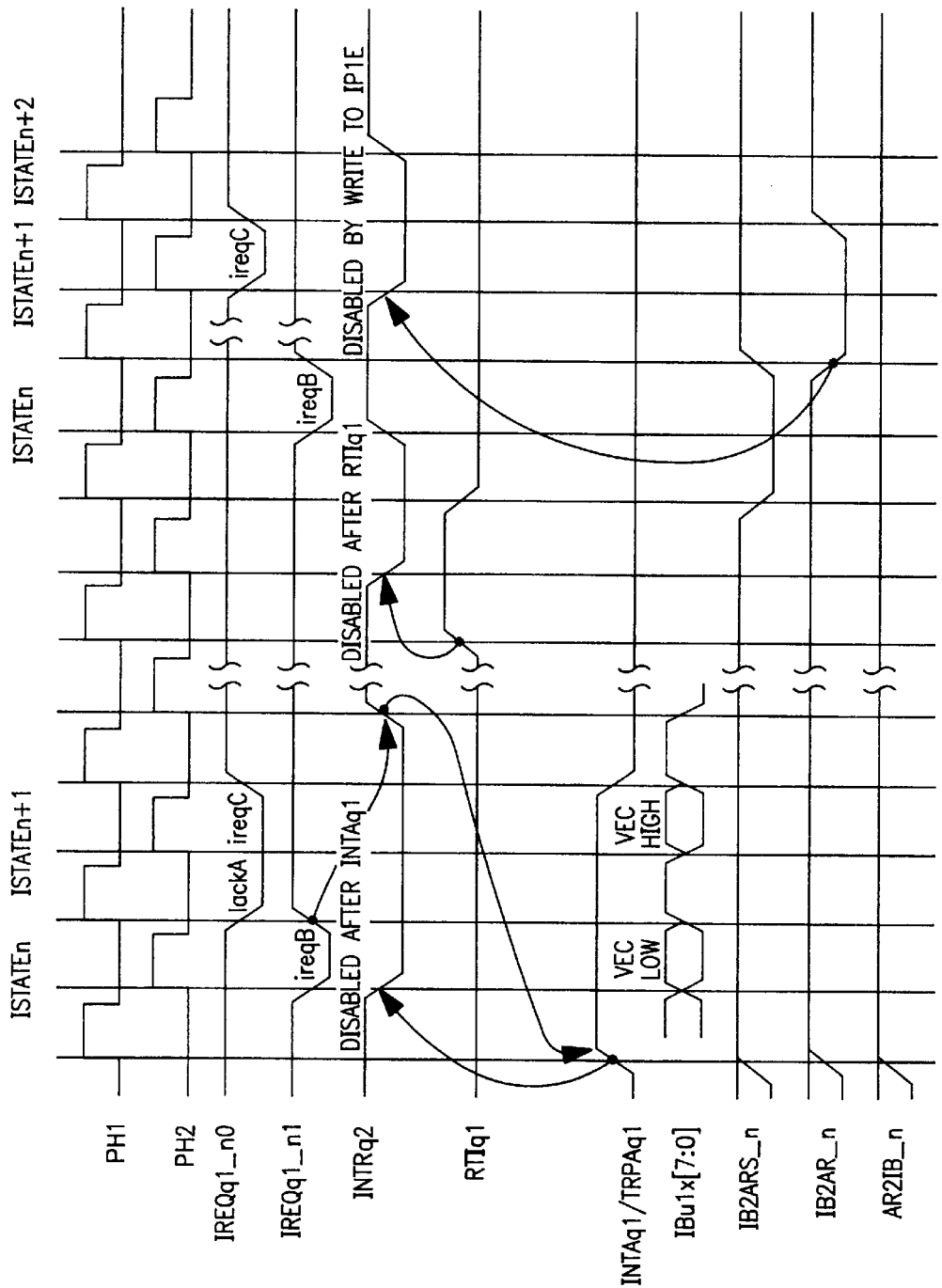
FIG. 3D illustrates a timing diagram showing the handshake signals between the processor and the present invention.

FIG. 3D illustrates a timing diagram showing the handshake signals between the CPU and the IHU. An interrupt acknowledge from the CPU is indicated by an active INTAq1 signal. The interrupt acknowledge renders the request signal, INTRq2, inactive in the next phase. The priority of a chosen interrupt is pushed onto the In-Progress Priority (IPP) stack, and the vector pointer is established.

Upon acknowledgment of the interrupt request by CPU, the interrupt acknowledge is conveyed to the interrupt source in PH1S (i.e., Phase I) of its corresponding window, which is indicated by ISTATEq1[1:0], by pulling the IREQq1_nX signal low. In the case of a TRAP acknowledge, which is indicated by the TRPAq1 signal, the IHU pushes the TRAP priority onto the IPP stack and places a trap vector on the IBu1x bus.

Transfer to an interrupt service routine (ISR) begins with a loading of the interrupt vector from a vector generator, is well known in the art. During an interrupt acknowledge cycle, which is indicated by an active INTAq1 signal and/or an active TRPAq1 signal, two consecutive bytes from a vector table are transferred to the IBu1x bus to be read by the CPU, as illustrated in FIG. 3D. The vector address is selected based on a combination of the INTAq1 and TRPAq1 signals, as will be illustrated in Table II.

Figure 3E:
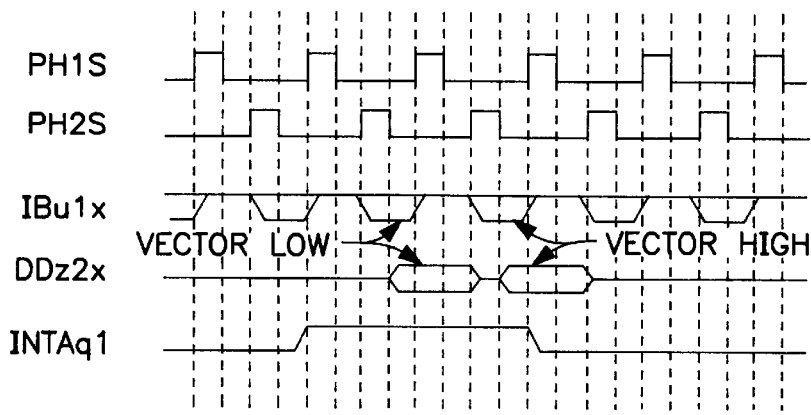
FIG. 3E illustrates how vector addresses are transferred in the present invention.

FIG. 3E illustrates how vectors are transferred through the data bus, DDz2x.

FIG. 3D also illustrates the retrieval and earliest recovery of an interrupt request under the following conditions:
a. An interrupt is being acknowledged;
b. A return from interrupt (RETI) instruction is executed;
c. There is a write to an interrupt enable (IE) or interrupt priority (IP) register. In this case, a current interrupt request in the queue is discarded. In the next state, an interrupt request process begins with no interrupt request in a queue.

Upon completion of the ISR, execution of the RETI instruction pops the IPP stack and decrements the IPP stack pointer. During Idle Mode, as PH1S and PH2S are still active, the IHU will continue to function as normal. During Power Down Mode, the IHU maintains its state.

Figure 4A:
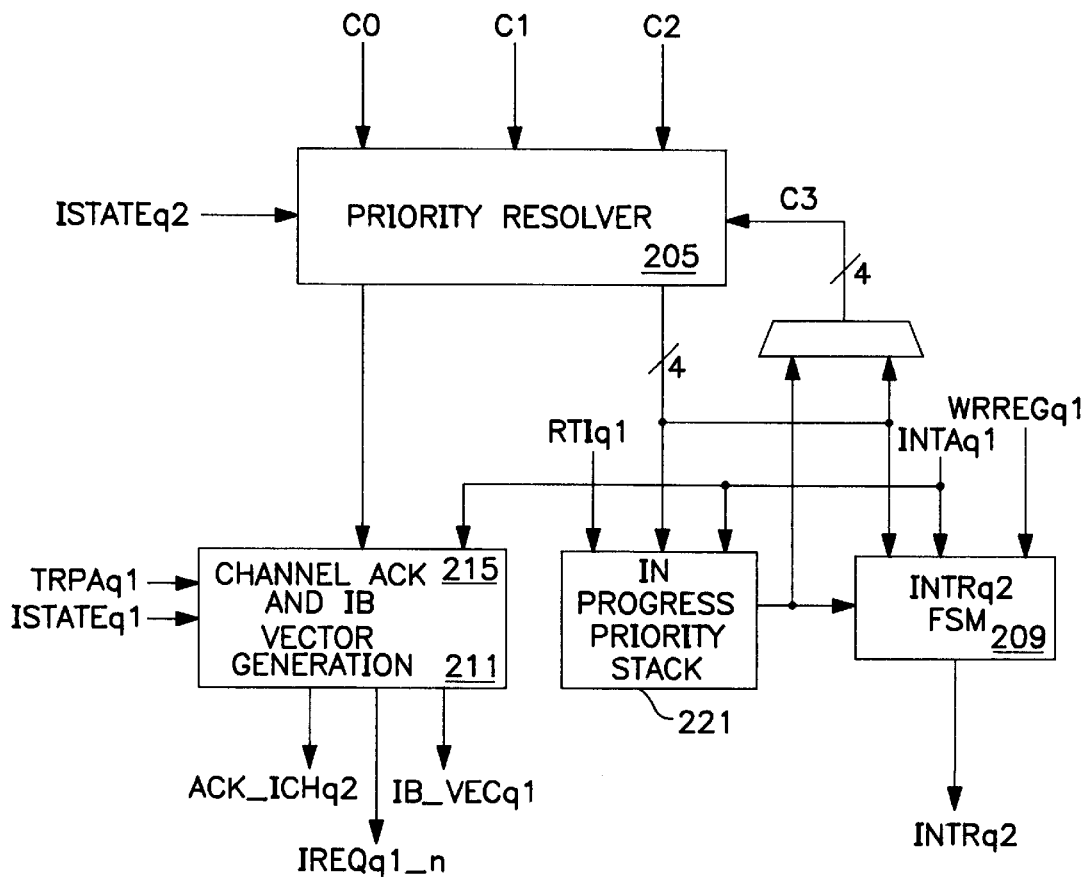
FIG. 4A is a block diagram illustrating the present invention.

FIG. 4A illustrates the interrupt priority determination circuit 201 of the present invention. The interrupt priority determination circuit 201 performs priority resolution of all interrupts, issues interrupt requests to the CPU, controls the in-progress stack for interrupt nesting, and generates the channel acknowledge signals (ACK_ICHq2[2:0]) and the Interrupt Acknowledge Vector (IB_VECq1[7:0]). The interrupt priority determination circuit 201 handles interrupt requests using the following algorithm. If the current highest priority interrupt is a higher priority than the in-progress priority, an interrupt request is sent to the CPU via the INTRq2 signal. This comparison takes place every clock cycle in the interrupt priority determination circuit 201. Once an interrupt is issued, priority resolution continues to take place. If an interrupt of higher priority arrives before the interrupt acknowledge signal, it supersedes and becomes an interrupt-in-wait. Upon receipt of an acknowledge from the processor, the interrupt-in-wait becomes an in-progress interrupt (i.e., the interrupt currently being serviced by the CPU).

When the interrupt acknowledge (i.e., the INTAq1 signal) arrives, the proper interrupt vector is sent out on IB_VECq1, and the interrupt priority is pushed onto the in-progress priority stack. Once the INTAq1 signal has been received, only interrupts of higher priority can cause another interrupt. When a return from interrupt (RTIq1) is received, the highest priority interrupt is popped off the in-progress priority stack.

FIG. 4B describes the functional signals of the interrupt priority determination circuit 201.

The interrupt priority determination circuit 201 includes a priority resolver 205. The priority resolver 205 performs the interrupt priority resolution function for the IHU to determine the interrupt to be serviced. The priority resolution is a two-tier function. Each interrupt has a two-bit priority value determined by the value in the priority registers (IPL0, IPH0, IPL1, IPH1). The lowest priority is zero (i.e., 0b00), and the highest priority is three (i.e., 0b11). The NMI (non-maskable interrupt) interrupt is assigned a priority of four (i.e., 0b100), and a TRAP interrupt is assigned a priority of five (i.e., 0b101).

If two interrupts have the same priority, a second hardwired priority function is used to determine the "winner". Each channel has its own hardwired priority, with channel three being the lowest priority, and channel zero being the highest priority. Within a given channel, state three is the lowest priority and state zero is the highest priority. Thus, within a given priority level, the interrupts are ranked from channel two state three (lowest) to channel zero state zero (highest).

Figure 5:
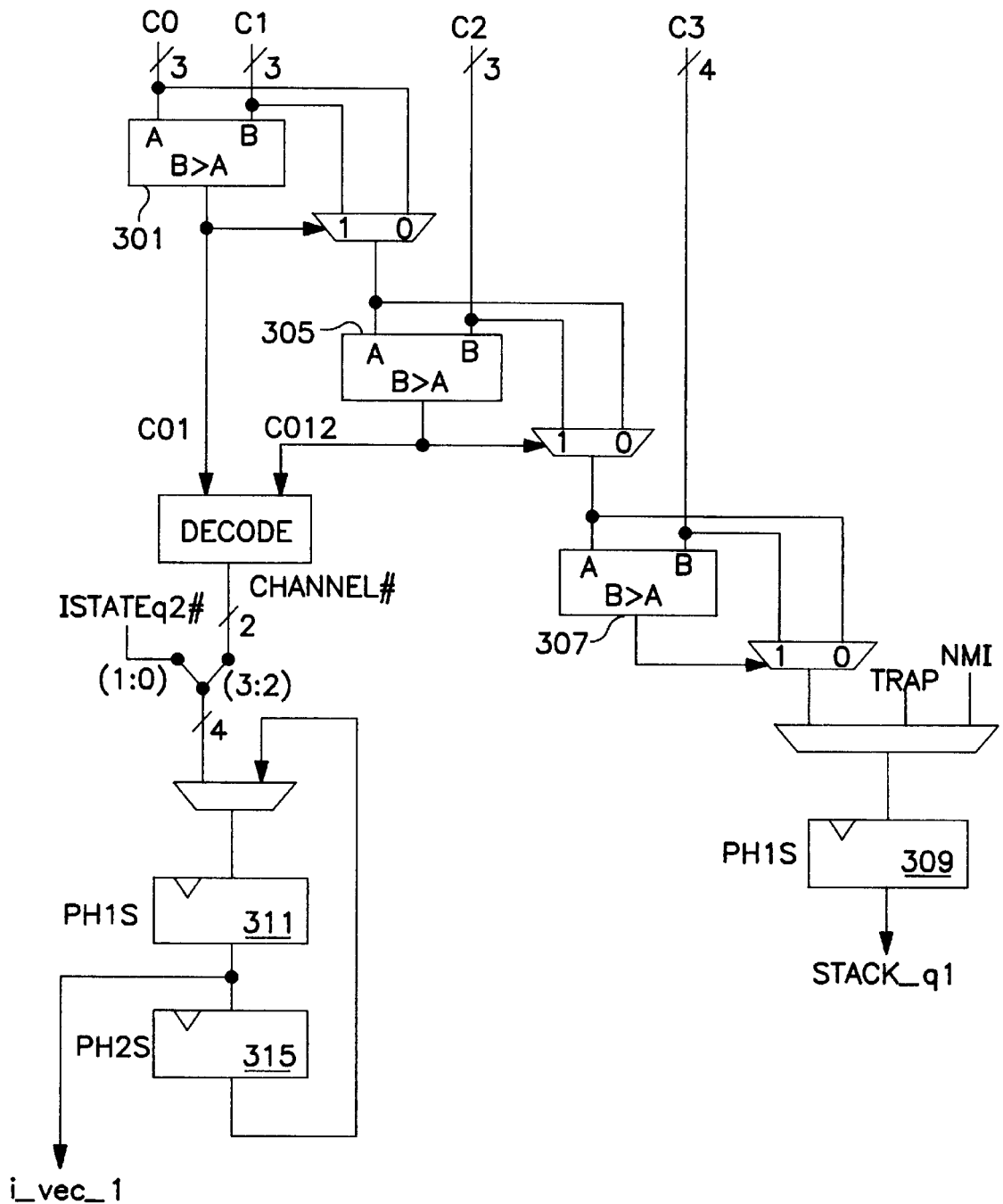
FIG. 5 illustrates a detailed functional diagram of the priority resolver of the present invention.

FIG. 5 illustrates a detailed functional diagram of the priority resolver 205 of the present invention. The priority resolver 205 includes three inputs (C0, C1, and C2). The three inputs, C0, C1 and C3, are created by concatenating the masked channel interrupt request with the channel priority value as indicated below.

C0=NOT(ICH0) & ICH0_PRIO
C1=NOT(ICH1) & ICH1_PRIO
C2=NOT(ICH2) & ICH2_PRIO

The effect of these logical equations is to produce three signed numbers that can be used to determine the relative priorities of the three channels. If a channel does not have an interrupt request in a given cycle, its value is a negative number, since the most significant bit (MSB) is a one.

If a channel does have an interrupt request, its value is positive since the MSB is a zero. Using these signed values for each channel, a series of comparisons is performed to determine the highest priority interrupt request for each cycle.

A first comparator 301 compares C0 with C1. If the two values are equal, C0 is chosen due to the hardwired priorities. The result of this comparison is compared with C2 using a second comparator 305. If these two values are equal, the C0/C1 value is chosen. The result of the second comparison is compared with C3 via a third comparator 307. C3 is the "winner" from the previous cycle. In this embodiment, C3 is a four-bit value. C3 is a four-bit value because the previous cycle may have produced a NMI (priority 0b100) or TRAP (priority 0b101) interrupt. The result of the three comparators (301, 305 and 307), together with the NMI and the TRAP signals determine the value latched into a PH1S latch 309 according to the following algorithm.

If a TRAP interrupt occurs, the TRAP interrupt value (0b0101) is latched. The current version of the IHU is designed to treat TRAP as either an instruction or an interrupt. The difference is that a TRAP instruction will cause the TRAP vector to be set in the IB Bus, but the TRAP interrupt value is not latched into the in-progress stuck (i.e., PH1S latch 309). The treatment of TRAP as an instruction or an interrupt is determined by the values of INTAq1 and TRPAq1, as illustrated in Table II.

TABLE II

TRAP Acknowledge Decode

| TRPA1 | INTAq1 | Description |
|---|---|---|
| 0 | 0 | No Interrupt Acknowledge. |
| 0 | 1 | Non-TRAP Interrupt Acknowledge. |
| 1 | 0 | TRAP Instruction. Output TRAP Vector. Do not push TRAP onto in-progress stack. |
| 1 | 1 | TRAP interrupt. Output TRAP Vector. Push TRAP onto in-progress stack. |

If there is no TRAP interrupt, but there is an NMI interrupt, then the NMI interrupt value (0b0100) is latched into PH1S 309. An NMI interrupt is defined as an interrupt on channel one during state three. If there are no TRAP or NMI interrupts, then the result of the comparators is latched into PH1S 309. It should be noted that the In-progress Priority is set to negative value after reset. This represents a priority lower than 0 so that an interrupt priority of 0 or higher can be awarded after reset. This represents a negative one value, which is the highest negative number.

In addition to latching the priority from the comparators, the state and channel value is also latched. The channel value is determined by decoding the result of the first two comparators 301 and 305. Table III illustrates a truth table for this decode.

TABLE III

Comparator Channel Decode

| CO1 | CO12 | Channel |
|---|---|---|
| 0 | 0 | 11 |
| 0 | 1 | 01 |
| 1 | 0 | 10 |
| 1 | 1 | 01 |

The channel result is the logical NOT of the actual channel. This value is concatenated with the NOT of ISTATEq2 to produce an unsigned four-bit number representing the channel and state of the "winning" interrupt. The reason the value is inverted is because of the reverse nature of the hardwired priority algorithm. Channel 0 state 0, which is the highest hardwired priority, is inverted to become 0b1111, which is the highest unsigned number represented by four bits. Likewise, channel 2, state 3, which is the lowest hardwired priority, is inverted to become 0b0100, which is the lowest unsigned value which can be represented with three channels.

The channel and state value is latched in another PH1S latch 311 according to the following algorithm.

If the current interrupt is a TRAP interrupt, the channel and state are a "don't care" value, and the feedback path from the PH2S latch 315 is selected. If the current interrupt is an NMI interrupt, the value 0b1000 (i.e., channel 1, state 3) is selected.

If the current highest priority interrupt is higher than the previous highest priority interrupt, the decoded channel and state value is selected. In all other cases, the feedback from the PH2S latch 315 is selected.

Figure 6:
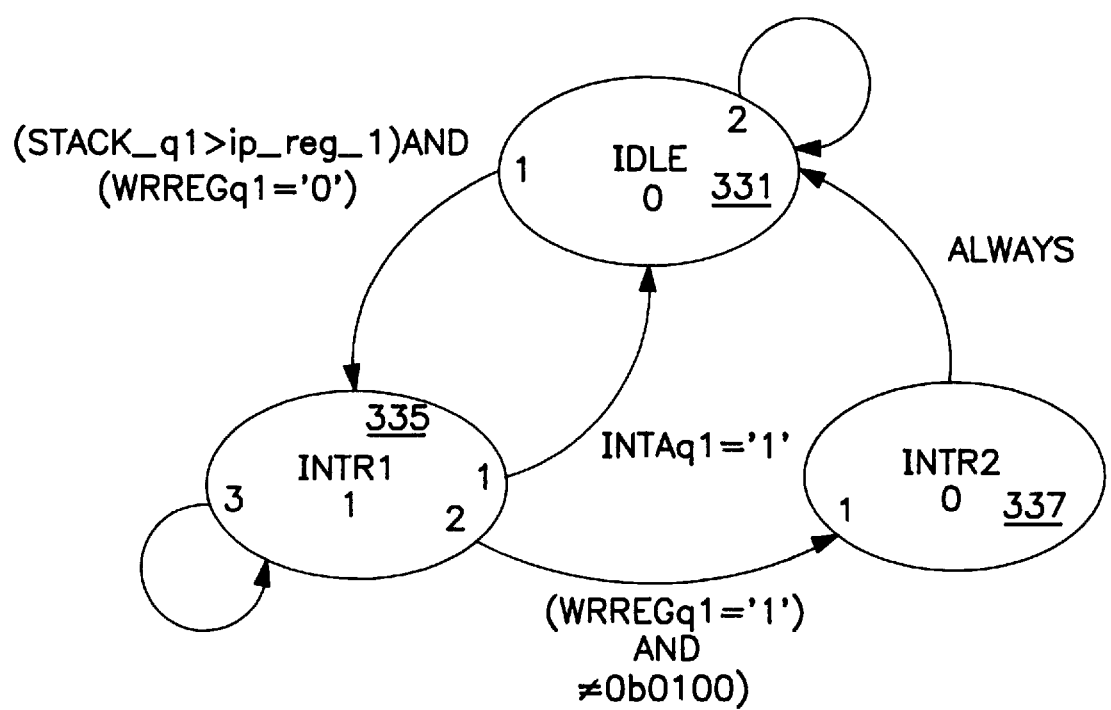
FIG. 6 illustrates a state diagram for the INTRq2 control circuit of the present invention.

FIG. 6 illustrates in greater detail the state diagram for the INTRq2 finite state machine 209 of the present invention. The interrupt request state machine 209 generates the INTRq2 output signal. This is the interrupt request signal that goes to the CPU.

From an IDLE state 331, INTRq2 goes high if the current interrupt priority (from the priority resolver 205) is greater than the in-progress priority (i.e., stack_q1>ip_reg_1), and TRPAq1 and WRREGq1 are zero. The TRAP interrupt is different from other interrupts because there is no interrupt request. The CPU decodes a TRAP instruction and sends a TRAP acknowledge. Therefore, if the current priority indicates a TRAP interrupt, no interrupt request is issued. When WRREGq1 is a one, this indicates a write is being performed to the IEx, IPLx or IPHx registers. If this occurs, no interrupt request is generated on the current cycle.

Once an interrupt request is issued, the state machine stays in state INTR1 335 until one of two conditions occurs. If an interrupt acknowledge is received, the INTRq2 is set to zero, and the state machine transitions back to the IDLE state 331.

If WRREGq1 goes high, and the current interrupt is not an NMI interrupt, the INTRq2 signal is set to zero and the state machine transitions to a INTR2 state 337.

If a write to the IEx, IPLx or the IPHx registers occurs before an interrupt acknowledge is received, the interrupt request is cancelled unless it was a result of an NMI interrupt. The state machines goes to the INTR2 state 337 for one cycle to insure that a feedback value to the priority resolver (C3) is cleared.

Figure 7:
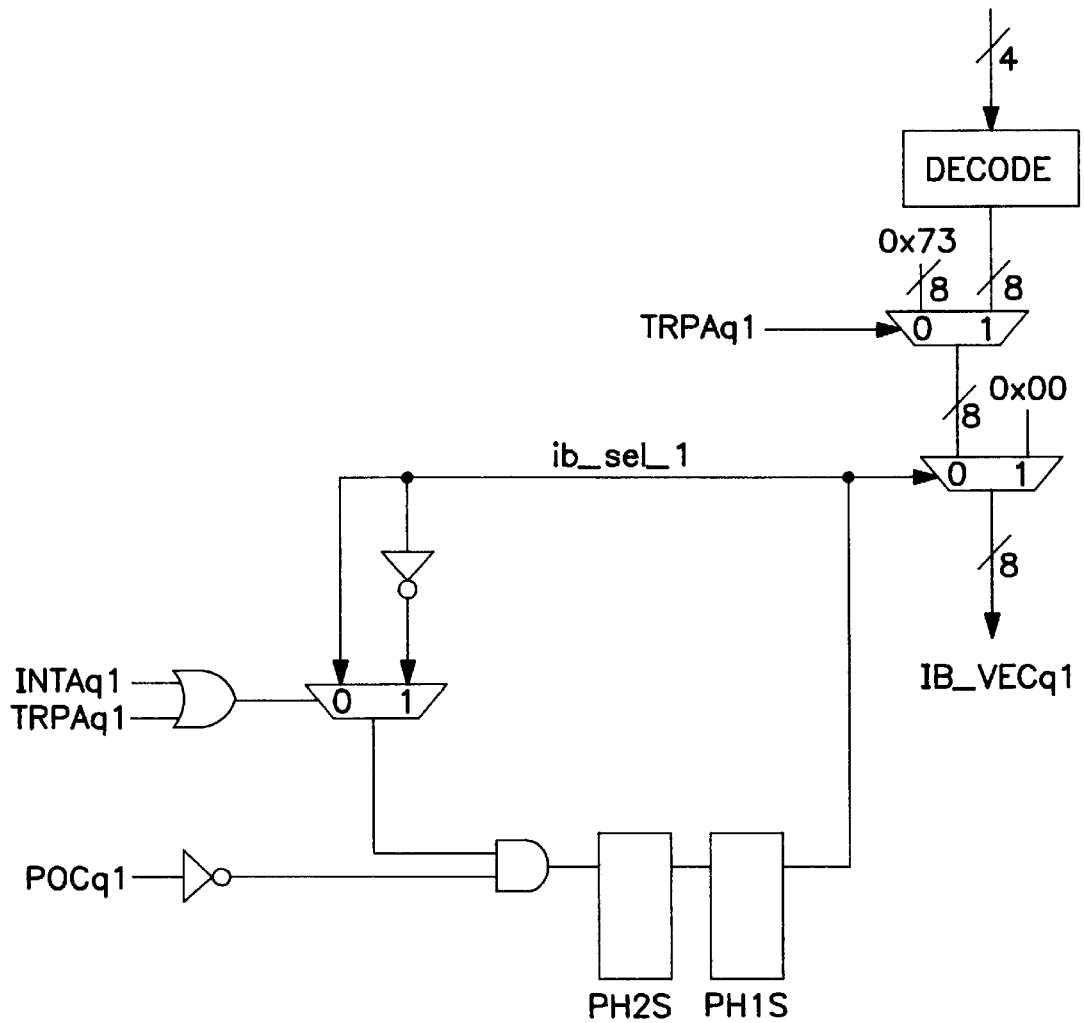
FIG. 7 illustrates a functional diagram of the ISR Vector generation unit of the present invention.

FIG. 7 illustrates a functional diagram of the ISR vector generation unit 211 of the present invention. When an interrupt acknowledge is received, the IHU outputs the ISR vector to the IB bus and issues an acknowledge to the peripherals via the IREQq1_n bus. Both of these functions use the channel and state value that is latched in the priority resolver 205 that was discussed previously. The ISR vector, IB_VECq1[7:0], is a two-byte value output which is driven onto the IB bus when INTAq1 or TRPAq1 is active.

Figure 8:
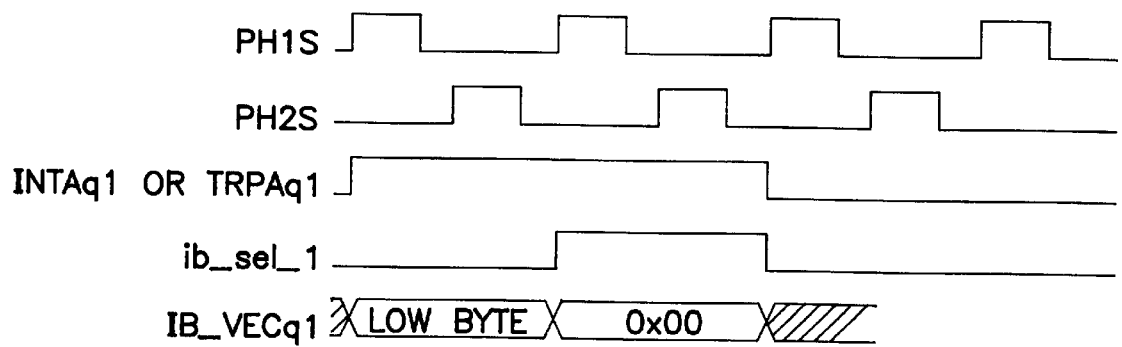
FIG. 8 illustrates a timing diagram of the ISR Vector circuit.

FIG. 8 illustrates a timing diagram for the ISR vector generation unit 211, as shown in FIG. 7. As is evident from FIG. 8, when an interrupt acknowledge is received (i.e., the INTAq1 signal is received), the IHU acknowledges the peripherals via a IREQq1_n signal.

Figure 9:
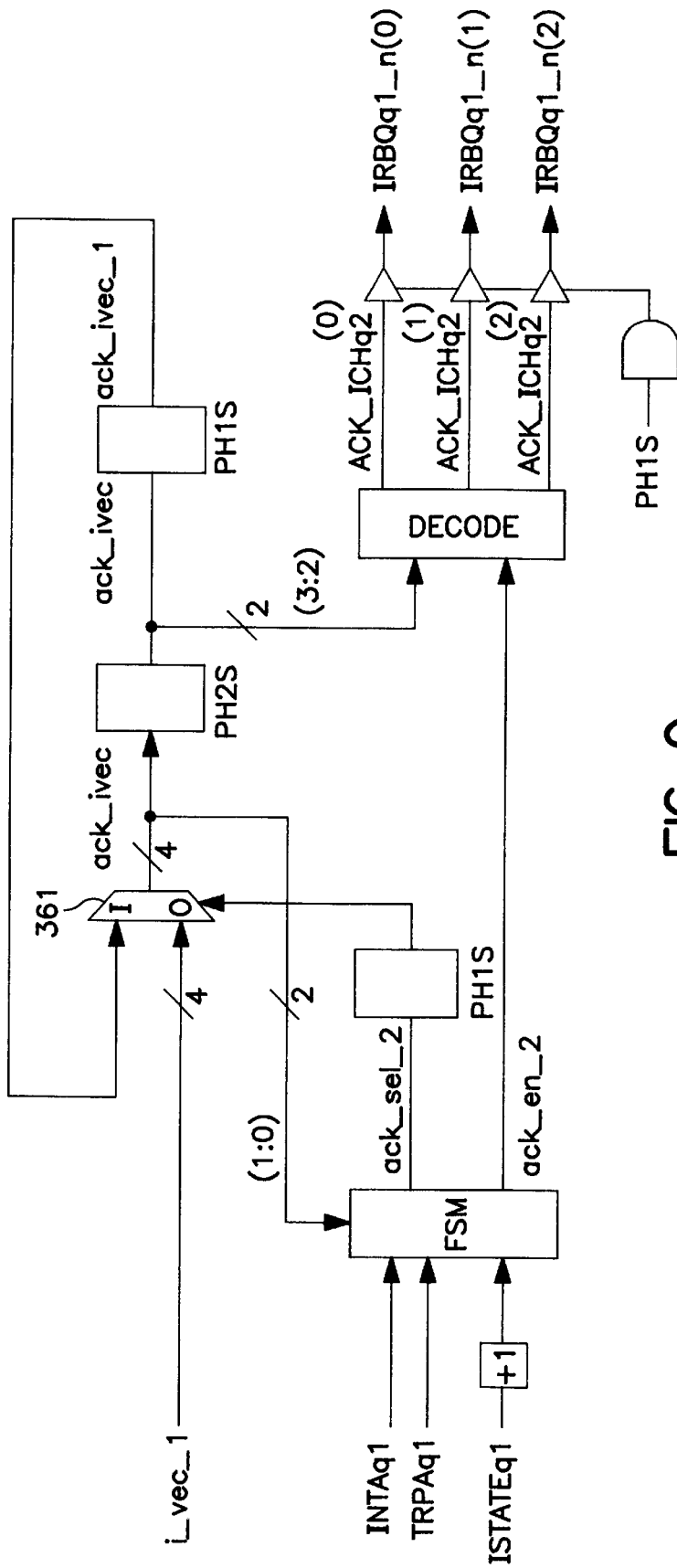
FIG. 9 illustrates a block diagram of the channel acknowledge unit.

FIG. 9 illustrates a functional diagram of the logic that generates the peripheral acknowledge signal. The channel acknowledge circuit uses the channel and state value latched in the priority resolver (i.e., i_vec_1) to determine the channel and state during which the acknowledge is to be issued. The finite state machine for the channel acknowledge circuit includes a state machine that generates control signals to coordinate the acknowledged function.

Figure 10:
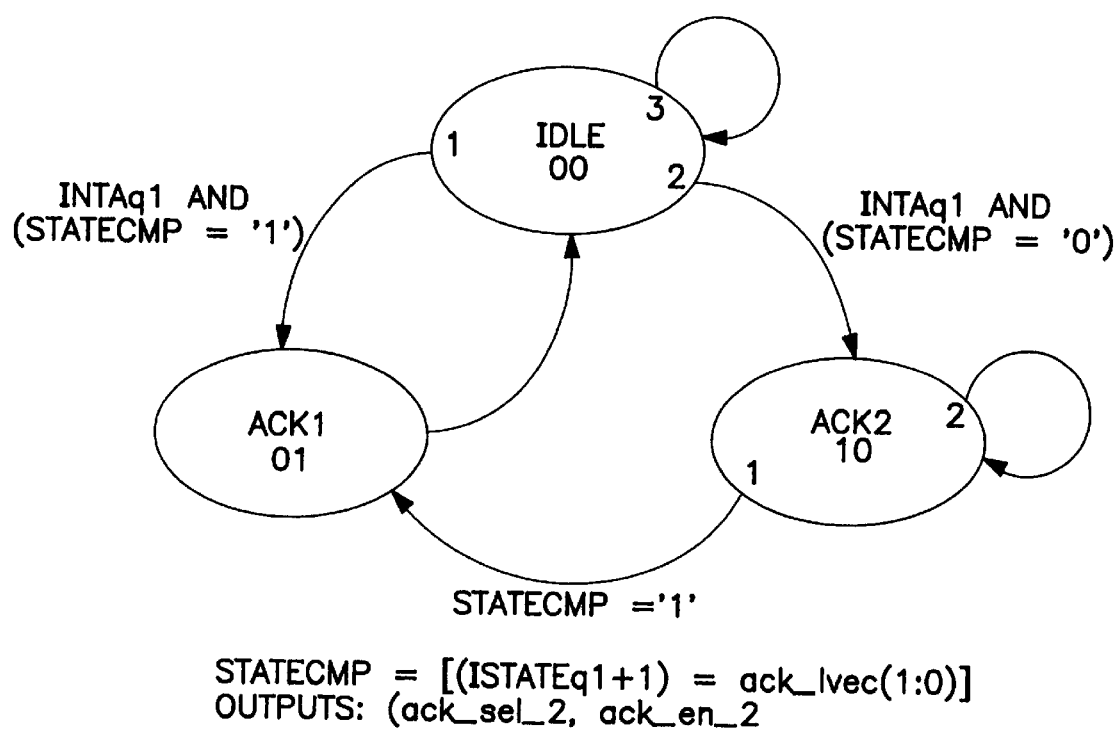
FIG. 10 illustrates a state diagram of the channel acknowledge unit of the present invention.

FIG. 10 illustrates the state machine for the channel acknowledge circuit illustrated in FIG. 9. The channel acknowledge circuit 215 generates two control signals. The signal, ack_en_2, generates an enable signal that is used to decode a two-bit channel value from the priority resolver 205 into the channel acknowledge signal (ACK_ICHq2). Table IV illustrates a truth table for the ACK_ICHq2 signal.

TABLE IV

Channel Acknowledge Decode

| ack_en_2 | ack_ivec_2 [3] | ack_ivec_2 [2] | ACK_ICHq2[2:0] |
|---|---|---|---|
| 0 | X | X | 0b111 |
| 1 | 0 | 0 | 0b110 |
| 1 | 0 | 1 | 0b101 |
| 1 | 1 | 0 | 0b011 |
| 1 | 1 | 1 | 0b111 |

The ack_sel_2 signal is used to store the channel and state value from the priority resolver 205 until the proper state is reached. Since the interrupt acknowledge can arrive at any time, the current state may not be the same as the interrupt state. The channel acknowledge circuit 215 waits until the current state is at the proper value before issuing the ack_en_2 enable signal. The ack_sel_2 signal switches a multiplexer 361 (see FIG. 9) to select a feedback path to save the channel and state value.

Figure 11:
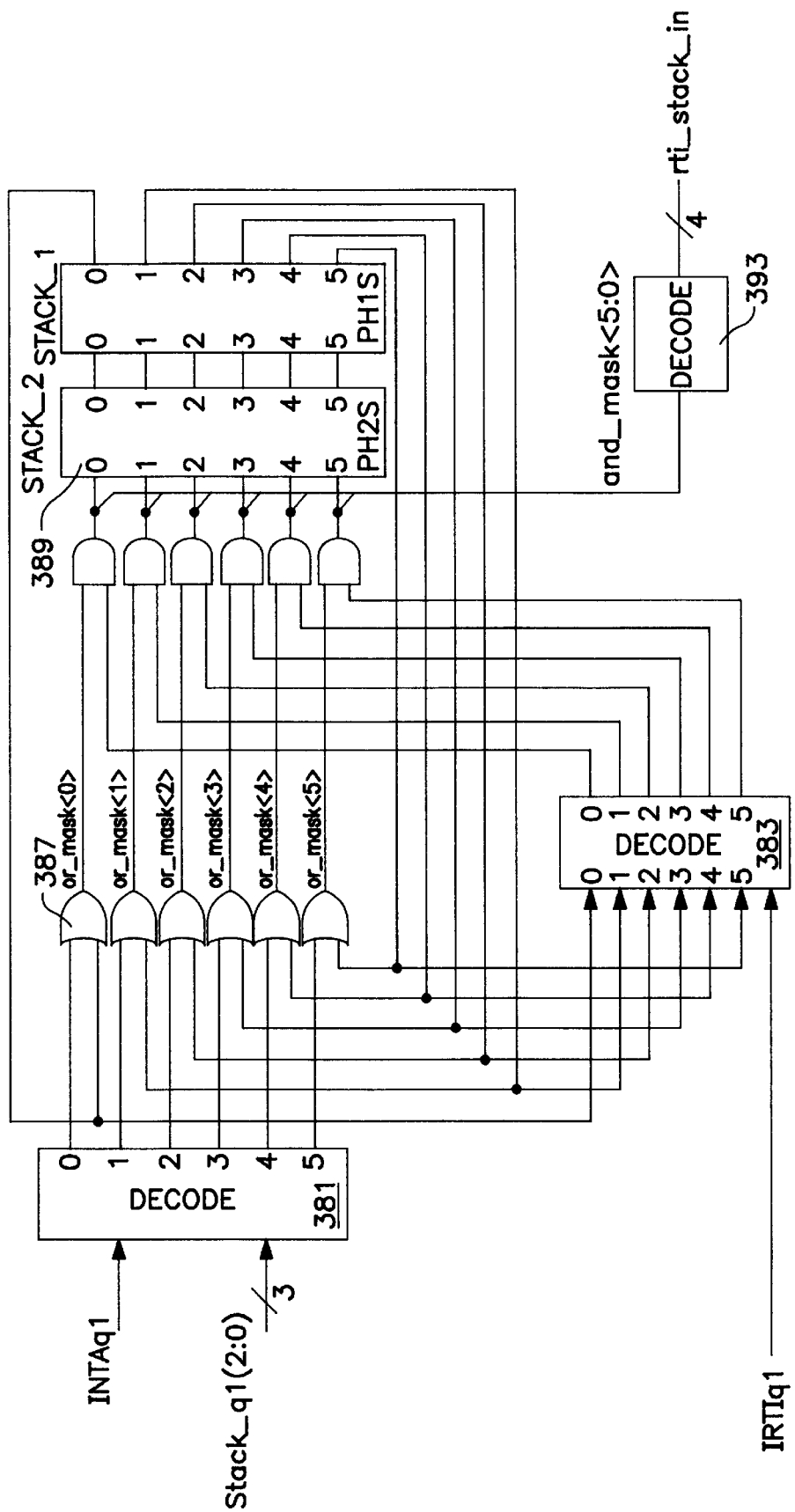
FIG. 11 illustrates a functional diagram of the In-Progress Stack of the present invention.

FIG. 11 illustrates a functional diagram of the in-progress priority stack 221, as shown in FIG. 4A. The in-progress priority stack 221 pushes the priority result from the priority resolver 205 onto the stack during interrupt acknowledge (INTAq1) and pops the highest priority off the stack during a return from interrupt (RTIq1). The in-progress priority stack 221 is used to control interrupt nesting.

As interrupts are serviced, their priorities are pushed onto the stack. Subsequent interrupt priorities are compared against the highest priority on the stack. Only interrupts with a priority higher than the stack causes an interrupt request to be generated.

The in-progress stack 221 does not function as a normal stack, in that there are no read and write pointers. The stack is a six bit vector, and priorities are "pushed" onto the stack by setting the bit corresponding to the interrupt priority. Priorities are popped from the stack by clearing the most significant bit that is set. The pushing and popping functions are controlled by a first decoder 381 and a second decoder 383.

The first decoder 381 controls the stack pushing operation. The first decoder 381 takes the interrupt acknowledge (INTAq1) input and the priority result from the priority resolver 205 to produce a six bit value according to the truth table shown in Table V.

TABLE V

In-Progress Stack Push Decode Truth Table

| INTAq1 | stack_q1[2] | stack_q1[1] | stack_q1[0] | Output[5:0] |
|---|---|---|---|---|
| 0 | X | X | X | 0b000000 |
| 1 | 0 | 0 | 0 | 0b000001 |
| 1 | 0 | 0 | 1 | 0b000010 |
| 1 | 0 | 1 | 0 | 0b000100 |
| 1 | 0 | 1 | 1 | 0b001000 |
| 1 | 1 | 0 | 0 | 0b010000 |
| 1 | 1 | 0 | 1 | 0b100000 |
| 1 | 1 | 1 | 0 | 0b000000 |
| 1 | 1 | 1 | 1 | 0b000000 |

The second decoder 383 controls the popping operation. The second decoder 383 takes the return from interrupt (RTIq1) input and the current stack contents (stack_1) and produces a six bit value according to the truth table shown in Table VI.

TABLE VI

In-Progress Stack POP Decode Truth Table

| RTIq1 | stack_1[5:0] | Output[5:0] |
|---|---|---|
| 0 | 0bXXXXXX | 0b111111 |
| 1 | 0b1XXXXX | 0b011111 |
| 1 | 0b01XXXX | 0b101111 |
| 1 | 0b001XXX | 0b110111 |
| 1 | 0b0001XX | 0b111011 |
| 1 | 0b00001X | 0b111101 |
| 1 | 0b000001 | 0b111110 |
| 1 | 0b000000 | 0b111111 |

When INTAq1 goes active, the push decoder 381 outputs a six bit value with one and only one bit set. The bit number corresponds to the priority values specified by stack_q1. This value flows through a corresponding OR gate 387 to form a six bit value called or_mask.

Since RTIq1 is zero when INTAq1 is one, the output of the POP decoder 383 is all ones. The result is a six bit and_mask value that is latched in the PH2S latch 389. The and_mask value is fed back to the OR gates 387 via a stack_1 register 389, and the bit remains set until the POP decoder 383 clears it.

The third decoder 393 decodes the and_mask value to produce a four bit value that is loaded into C3 in the priority resolver 205. This function is used when nesting interrupts.

For example, if a priority 3 and a priority 1 are currently pushed on the stack, the following occurs when RTIq1 arrives. The priority 3 bit in the and_mask is cleared, leaving the priority 1 bit set. This is decoded to produce a value of 0b0001 on rti_stack_in. Since this is now the priority level being serviced, this value is latched into C3 and fed back to the priority resolver 205. Table VII illustrates the truth table for the rti_stack_in decoder 393.

TABLE VII

RTI_STACK_IN Decode Truth Table

| and_mask[5:0] | rti_stack_in[3:0] |
|---|---|
| 0b1XXXXX | 0b0101 |
| 0b01XXXX | 0b0100 |

TABLE VII-continued

RTI_STACK_IN Decode Truth Table

| and_mask[5:0] | rti_stack_in[3:0] |
|---|---|
| 0b001XXX | 0b0011 |
| 0b0001XX | 0b0010 |
| 0b00001X | 0b0001 |
| 0b000001 | 0b0000 |
| 0b000000 | 0b1111 |

Figure 12:
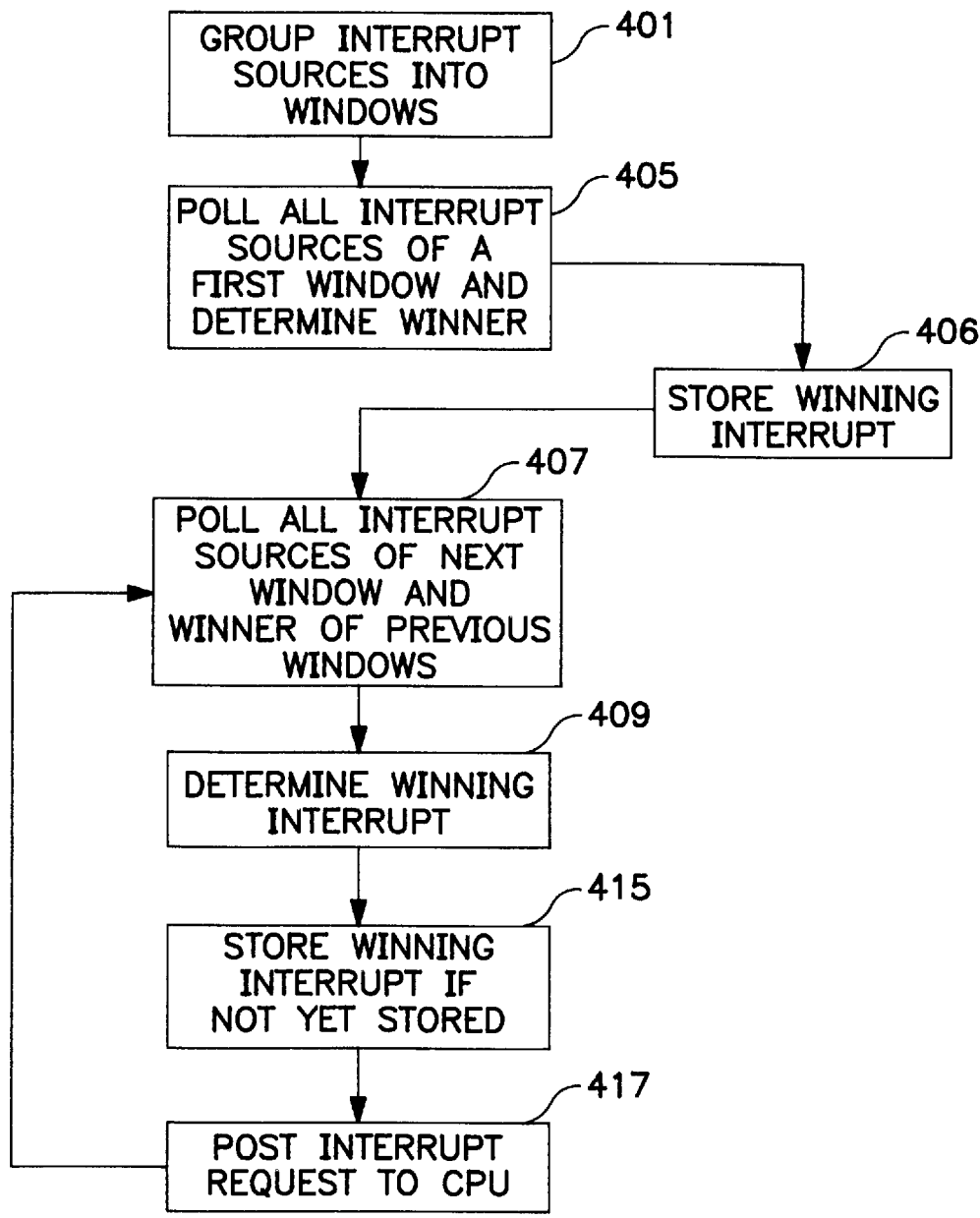
FIG. 12 illustrates a flow chart of the processing steps of the present invention.

FIG. 12 illustrates in greater detail for one embodiment of the present invention processing steps employed by the present invention. First, the present invention groups the interrupt sources into a plurality of windows (processing step 401). Second, the present invention polls and arbitrates among all the interrupt sources in a first window (processing step 405). Next, the present invention polls all the interrupt sources in the next window and arbitrates between the polled interrupts and the interrupt that "won" from the previous windows (processing step 407). The present invention then determines the winning interrupt from the interrupt sources in that window and the winning interrupt from the previous windows (processing step 409). Then, the present invention stores that interrupt into a register (processing step 415). The present invention then posts an interrupt request to the processor (processing step 417). The processing flow then returns to processing step 407 then executes the steps 407 through 417 until all the windows are polled.

Figure 13:
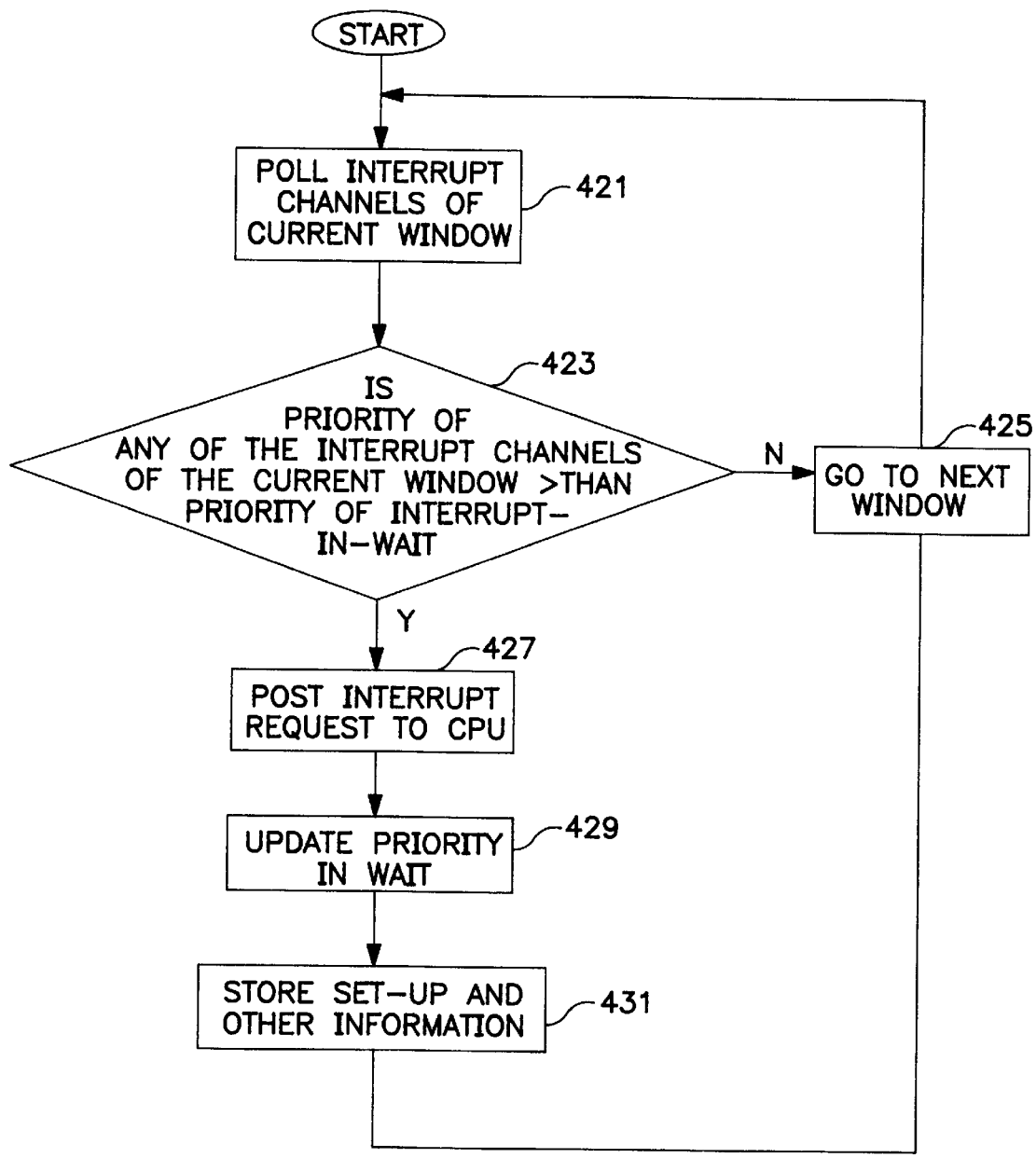
FIG. 13 illustrates the processing steps employed by the present invention in interrupt polling and arbitration.

FIG. 13 illustrates the processing steps employed by the present invention in interrupt polling and arbitration. As noted previously, the present invention divides the interrupt channels into a plurality of time windows. For each time window, the following processing steps are executed. First, the present invention polls the interrupt channels of the current window (processing step 421). Next, the present invention determines whether the priority of any of the interrupt channels of the current window is greater than a priority in wait (i.e., the priority of the interrupt-in-wait) (determination block 423). If not, the processing goes to the next window (processing step 425) and returns to processing step 421.

If the determination in determination block 423 is yes, the present invention posts an interrupt request to the processor (processing step 427). Next, the present invention updates the priority in wait (processing step 429) with the priority of the "winning" interrupt determined in determination block 423. Then, the present invention stores set-up information and information concerning the new interrupt-in-wait (processing step 431). For example, set-up information may include the priority of the particular interrupt, the specific channel and state of the interrupt, and whether or not that interrupt is enabled or disabled.

The present invention then proceeds to the next window (processing block 425) and continues execution at processing step 421.

As noted previously, the priority in wait is simply the priority of the highest priority interrupt processed so far. The interrupt-in-wait is higher in priority than the priority of the interrupt on the in-progress stack (i.e., the interrupt currently being serviced by the CPU). After an interrupt acknowledge is received from the CPU, the present invention makes the interrupt-in-wait into the in-progress interrupt. Accordingly, the priority in wait also keeps track of the highest priority interrupt from window to window. In other words, the priority in wait tracks the priority of the winning interrupt as the present invention steps through all the windows.

Figure 14:
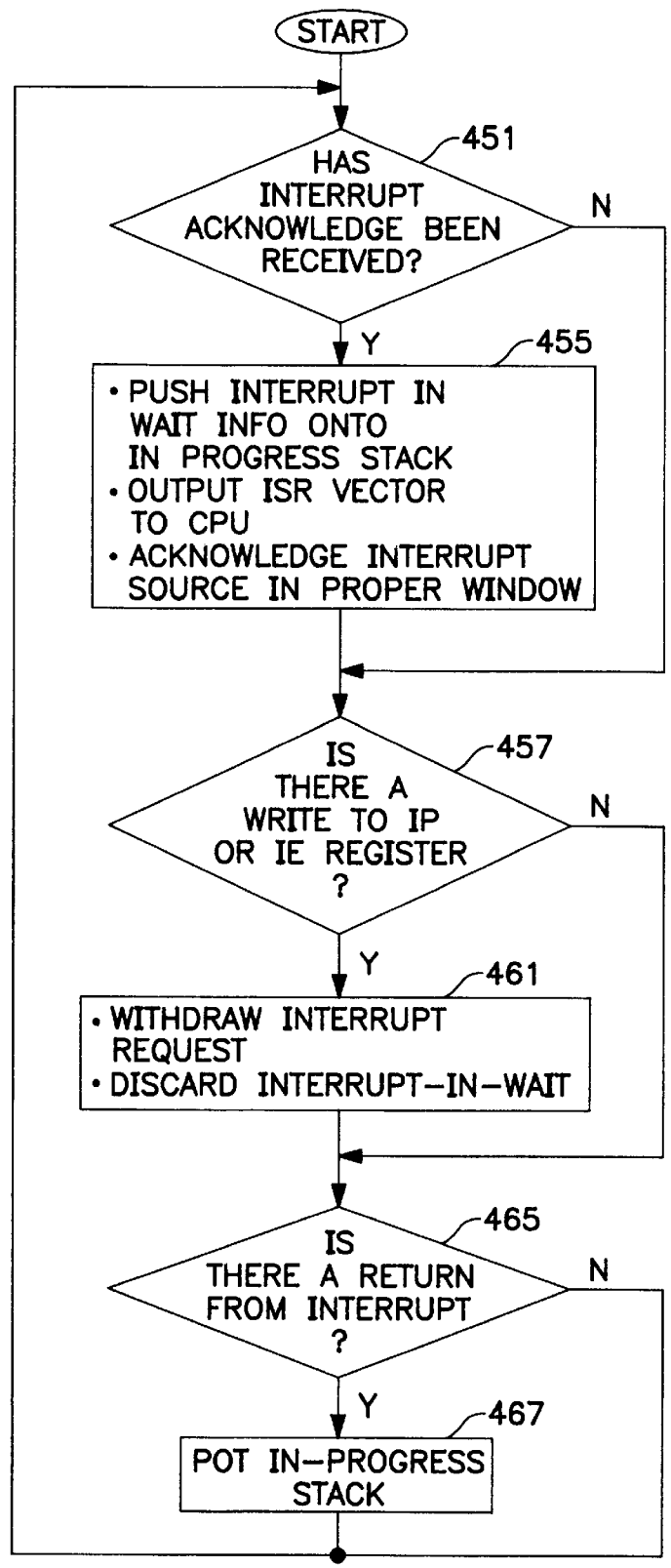
FIG. 14 illustrates the processing steps employed by the present invention in handling an interrupt acknowledge, a write to enable and priority registers, and a return from interrupt.

FIG. 14 illustrates the processing steps employed by the present invention to handle an interrupt acknowledge, a write to a priority or enable register, and a return from interrupt command. The present invention first determines whether or not an interrupt acknowledge has been received from the CPU (determination block 451). If yes, the present invention pushes the information (e.g., state, channel, and priority), associated with the interrupt-in-wait onto the in-progress stack (processing step 455). The present invention also outputs the interrupt service routine (ISR) vector to the CPU (processing step 455). The present invention then acknowledges the interrupt source in the same window in which the interrupt request was generated. If no, the present invention goes directly to decision block 457.

In decision block 457, the present invention determines whether or not a write to an interrupt priority (IP) register or an interrupt enable (IE) register has occurred. If yes, the present invention withdraws the interrupt request to the CPU (processing step 461). In one embodiment, all interrupt requests are withdrawn except a non-maskable intercept (NMI) interrupt. The present invention then discards the interrupt-in-wait because all the prior processing may not be valid. The reason why the interrupt-in-wait may not be accurate is that a write to the priority and enable registers may have changed the priorities of all the different interrupt sources. As a user may program the IP and IE registers to specify the interrupt priority of each source, a write to an IP or IE register requires that the interrupt-in-wait be initialized and for the current interrupt-in-wait to be discarded (processing step 461).

If it is determined that there was no write to an IP or IE register, then the present invention goes directly to decision block 465. In decision block 465, the present invention determines whether or not there was a return from interrupt. If yes, the present invention pops the in-progress stack (processing step 467). If no, the present invention skips processing step 467 and goes directly to step 451.

In the foregoing specification, the invention has been described with reference to specific exemplary embodiments thereof It will however be evident that various modifications and changes may be made thereto without departing from the broader spirit and scope of the invention as set forth in the appended claims. The specification and drawings are accordingly to be regarded as illustrative rather than restrictive.

What is claimed is:

1. A computer system comprising:

a) a processor for servicing interrupts;

b) N data conductors, each data conductor corresponding to an interrupt channel;

c) a plurality of devices coupled to the N data conductors, each device coupled to at least one of said data conductors and capable of asserting an interrupt request on at least one of the data conductors; and d) an interrupt handler unit (IHU) coupled to the processor via the N data conductors for handling interrupts, said IHU including an in-progress stack, said in-progress stack for storing information associated with an interrupt that is currently being serviced by the processor, said IHU polling and arbitrating interrupts in every time window;

wherein in each time window, N interrupt channels are processed, said computer system having N×M time-multiplexed interrupt channels, said computer system having a state signal indicative of the time window currently being processed, each device capable of asserting an interrupt request on at least one of the data conductors, said devices sending the interrupt request signal in a predetermined time window and receiving an acknowledge from the IHU in the same predetermined time window.

2. The interrupt controller of claim 1, wherein the IHU further includes:

an interrupt-in-wait register for storing information associated with an interrupt-in-wait, said interrupt-in-wait having a priority greater than the priority of the in-progress interrupt; and a priority resolver for tracking the interrupt-in-wait and if the priority of an interrupt in the time window is greater than the priority of the interrupt-in-wait, replacing the interrupt-in-wait with that interrupt.

3. In a computer system having a processor for servicing interrupts, an interrupt handler unit (IHU) coupled to the processor for handling interrupts, said IHU including a register for storing information associated with an interrupt-in-wait, said information including the priority of the interrupt-in-wait, a plurality of interrupt channels, grouped into a plurality of windows, and a plurality of devices coupled to the IHU via the plurality of interrupt channels, a method for processing interrupts comprising the steps of:

for each window a) polling the interrupt channels of a current window;

b) determining whether or not the priority of the interrupt of the interrupt channels of the current window is greater than the priority of the interrupt-in-wait;

c) if yes, posting an interrupt request to the processor, updating the interrupt-in-wait register with information associated with the interrupt of the current window that had a priority exceeding the priority of the interrupt-in-wait;

d) if no, proceeding to a next window;

wherein in each time window, N interrupt channels are processed, said computer system having N×M time-multiplexed interrupt channels, said computer system having a state signal indicative of the time window currently being processed, each device sending an interrupt request signal in a predetermined time window and receiving an acknowledge from the IHU in the same predetermined time window.

4. The method of claim 3 wherein said computer system further includes an in-progress stack for storing information associated with an in-progress interrupt, said in-progress interrupt currently being serviced by the processor; said method further comprising the steps of:

a) determining if an interrupt acknowledge is received from the processor;

b) if yes, pushing information associated with the interrupt-in-wait onto the in-progress stack;

providing an interrupt service routine (ISR) vector to the processor; and acknowledging the interrupt source in a window corresponding to the window in which the request from the interrupt source was generated.

5. The method of claim 4 further comprising the steps of:

a) if an interrupt acknowledge is not received from the processor, determining if a write to the interrupt priority registers and interrupt enable registers occurred;

b) if the determination in processing step a) is yes, withdrawing an interrupt request to the processor, and discarding the interrupt-in-wait.

6. The method of claim 5 further comprising the steps of:

a) if a write to the interrupt priority registers and interrupt enable registers has not occurred, determining if a return from interrupt has occurred;

b) if yes, popping the in-progress stack and continuing processing in the next window, c) else, continue processing in the next window.

7. In a computer system having a processor for servicing interrupts, an interrupt handler unit (IHU) coupled to the processor for handling interrupts, said IHU including an in-progress stack for storing information associated with an interrupt that is currently being serviced by the processor, a plurality of devices coupled to the IHU via N interrupt channels, said computer system configured to have M time windows, a method for processing interrupts comprising the steps of:

in each of the time windows a) polling the interrupt channels associated with a current time window;

b) determining a current highest priority interrupt for the current time window;

c) sending an interrupt to the processor if the current highest priority interrupt is a higher priority then the interrupt that is currently being serviced by the processor;

d) storing the current highest priority interrupt as an interrupt-in-wait if it interrupts the processor before an interrupt acknowledge is received for a preceding interrupt;

e) moving to a next time window;

wherein in each time window N interrupt channels are processed, said computer system having N×M time-multiplexed interrupt channels, said computer system having a state signal indicative of the time window currently being processed, said plurality of devices, each coupled to at least one of said interrupt channels for asserting an interrupt request on at least one of the interrupt channels, said devices sending the interrupt request in a predetermined time window and receiving an acknowledge from the interrupt handler unit in the same predetermined time window.

8. The method of claim 7, wherein a time window includes a first phase and a second phase, said polling of the interrupt channels occurring in the second phase;

and said arbitration of the interrupts occurring in the first phase.

9. The method of claim 7, wherein N is equal to 3, M is equal to 4 and there are twelve time-multiplexed interrupt channels.

10. The method of claim 7, further comprising the step of initializing the interrupt-in-wait with the interrupt in-progress.

11. The method of claim 7, further comprising the step of generating an interrupt request to the processor for the interrupt-in-wait upon receiving an interrupt acknowledge from the processor.

* * * * *